(12) United States Patent
Husemann et al.

(10) Patent No.: US 8,012,581 B2
(45) Date of Patent: Sep. 6, 2011

(54) BILAYER PRESSURE-SENSITIVE ADHESIVES

(75) Inventors: Marc Husemann, Hamburg (DE); Stephan Zollner, Hamburg (DE)

(73) Assignee: tesa AKTIENGESELLSCHAFT, Hamburg (DE)

( * ) Notice: Subject to any disclaimer, the term of this patent is extended or adjusted under 35 U.S.C. 154(b) by 929 days.

(21) Appl. No.: 11/004,448

(22) Filed: Dec. 3, 2004

(65) Prior Publication Data
US 2005/0154166 A1    Jul. 14, 2005

(30) Foreign Application Priority Data
Dec. 5, 2003 (DE) ................... 103 57 322

(51) Int. Cl.
B32B 15/04 (2006.01)
B32B 27/08 (2006.01)
B32B 5/00 (2006.01)
B05D 3/02 (2006.01)

(52) U.S. Cl. ............. 428/355 AC; 428/520; 264/638; 427/372.2

(58) Field of Classification Search .............. 428/516, 428/520, 345, 355 AC; 427/372.2; 264/638
See application file for complete search history.

(56) References Cited

U.S. PATENT DOCUMENTS

| | | | |
|---|---|---|---|
| 2,889,038 A | 6/1959 | Kalleberg | 206/59 |
| 4,335,171 A | 6/1982 | Zenk | 428/40 |
| 4,581,429 A | 4/1986 | Solomon et al. | 526/220 |
| 4,945,491 A | 7/1990 | Rishel | 364/510 |
| 5,654,387 A * | 8/1997 | Bennett et al. | 526/307.7 |
| 5,665,835 A * | 9/1997 | Epple et al. | 526/185 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,919,871 A | 7/1999 | Nicol et al. | 525/333.8 |
| 6,106,941 A * | 8/2000 | Fisher et al. | 428/355 EN |
| 6,114,482 A | 9/2000 | Senninger et al. | 526/172 |
| 6,479,608 B1 | 11/2002 | Nesvadba et al. | 526/328.5 |
| 6,703,073 B2 * | 3/2004 | Husemann et al. | 427/208.4 |
| 2003/0124347 A1 * | 7/2003 | Sasongko | 428/355 EN |

FOREIGN PATENT DOCUMENTS

| | | |
|---|---|---|
| DE | 199 49 352 A1 | 4/2000 |
| EP | 0308216 | 3/1989 |
| EP | 0 735 052 A2 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |

(Continued)

OTHER PUBLICATIONS

T.G. Fox, Bull Am. Phys. Soc. 1 (1956) p. 123.

(Continued)

*Primary Examiner* — Kevin R. Kruer
(74) *Attorney, Agent, or Firm* — Norris, McLaughlin & Marcus, P.A.

(57) ABSTRACT

The invention relates to a bilayer pressure-sensitive adhesive. Provision is made for the bilayer pressure-sensitive adhesive to comprise an apolar layer and a polar layer,
the apolar layer and the polar layer each comprising a polyacrylate pressure-sensitive adhesive having a static glass transition temperature of not more than +15° C., and
the surface energy of the apolar layer differing from the surface energy of the polar layer by at least 5 mN/m.

10 Claims, 1 Drawing Sheet

FOREIGN PATENT DOCUMENTS

| | | |
|---|---|---|
| EP | 1302521 | 9/2002 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 99/31144 | 6/1999 |

OTHER PUBLICATIONS

Houben Weyl, Methoden der Organischen Chemie, vol. E 19a, pp. 60-147.

Macromolecules, 1995, 28, 7886.

Macromolecules, 2000, 33, 243-245.

Donatas Satas, "Handbook of Pressure Sensitive Adhesive Technology" (van Nostrand, New York 1989).

J.P. Fouassier, Photoinitiation, Photopolymerization and Photocuring, Fundamentals and Applications, Hanser Publishers, Munich, Vienna, New York 1995.

A. Carroy, et al., Chemistry & Technology of UV & EB formulation for Coatings, Inks & Paints, vol. 5, ed. By P.K.T. Oldring, publ. By SITA Technology, London, England 1994.

Skelhorne "Electron Beam Processing" vol. 1 "Chemistry & Technology of UV & EB Formulations for Coatings, Inks & Paints" publ. Sita Technology, London 1991.

* cited by examiner

BILAYER PRESSURE-SENSITIVE ADHESIVES

The invention relates to a bilayer pressure-sensitive adhesive, processes for preparing it, and one use of such an adhesive.

BACKGROUND OF THE INVENTION

For adhesive bonds in industry it is very common to employ pressure-sensitive adhesives (PSAs) in the form of adhesive transfer tapes. Generally the materials to be bonded to one another are of the same constitution. For certain applications, however, the materials to be bonded may differ in their chemical constitution. A significant influence on the adhesiveness of a material is exerted by the surface tension. Generally speaking, low-energy surfaces, such as polyolefins, for example, bond less well. If the desire is then to bond these materials to high-energy surfaces, it is usual to use double-sided PSA tapes which are composed of a carrier layer and coated with two different PSAs.

As far as the adhesive bond is concerned, however, the carrier layer does not possess any function. There is therefore demand for a bilayer PSA which incorporates this function of the double-sided PSA tape without the need for a carrier layer.

The object on which the invention is based, therefore, is that of specifying a bilayer PSA allowing adhesive bonding of materials differing in constitution, particularly materials having surfaces of different energy. It is also intended that a process for preparing such a PSA, and one use of such a PSA, should be specified.

SUMMARY OF THE INVENTION

The invention provides a bilayer pressure-sensitive adhesive comprising an apolar layer and a polar layer, the apolar layer and the polar layer each comprising a polyacrylate pressure-sensitive adhesive having a static glass transition temperature of not more than +15° C., and
the surface energy of the apolar layer differing from the surface energy of the polar layer by at least 5 mN/m.

The invention accordingly provides a bilayer PSA which is polar on one side and apolar on the other. Surprisingly it has been found that bilayer PSAs of this kind outstandingly fulfil the object of the present invention.

Regarding measurement of the surface energies and bond strengths, refer to the "Test methods" section.

DETAILED DESCRIPTION

For simplification the apolar layer will also be referred to as layer A and the polar layer as layer B.

In one very preferred embodiment of the PSA of the invention layers A and B are joined to one another by physical or chemical pretreatment of A or B.

In order to obtain a polymer glass transition temperature, $T_g$, of not more than 15° C. the monomers of the first and second monomer compositions are very preferably selected, and the quantitative constitution of the monomer mixture advantageously chosen, in such a way as to give the desired $T_g$ for the polymer in accordance with equation (G1) (in analogy to the Fox equation (T. G. Fox, Bull. Am. Phys. Soc. 1 (1956) 123)).

$$\frac{1}{T_g} = \sum_n \frac{W_n}{T_{g,n}} \tag{G1}$$

In this formula n represents the serial number of the monomers employed, $w_n$ the mass fraction of the respective monomer n (in % by weight) and $T_{g,n}$ the respective glass transition temperature of a homopolymer of the respective monomer n, in kelvins.

LAYER A

Apolar Layer

Figure 1:
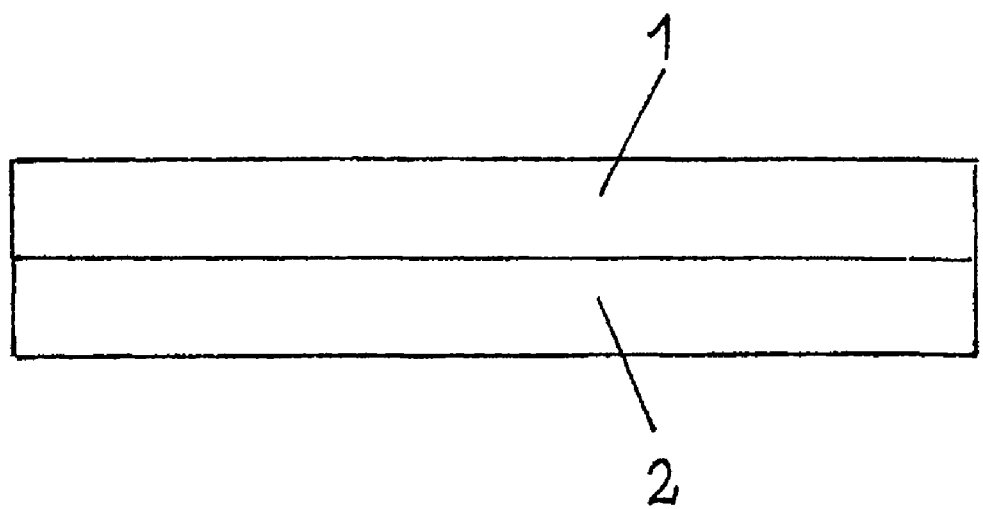
FIG. 1 shows a diagram of a PSA of the invention, reference numeral 1 identifying the polar layer (layer (A)) and reference numeral 2 the apolar layer (layer (B)).

The polyacrylate PSA of the apolar layer preferably comprises a polymer formed from a first monomer mixture comprising in respect of the first monomer mixture
(a1) from 58 to 90% by weight of acrylic and/or methacrylic esters of the formula $CH_2=CH(R_1)(COOR_2)$ where $R_1$ is H or $CH_3$ and $R_2$ is a linear or branched alkyl radical having 1 to 10 carbon atoms;
(b1) from 10 to 40% by weight of acrylic and/or methacrylic esters of the formula $CH_2=CH(R_{1a})(COOR_{2a})$ where $R_{1a}$ is H or $CH_3$ and $R_{2a}$ is a linear, cyclic or branched alkyl radical having 11 to 30 carbon atoms;
(c1) from 0 to 2% by weight of acrylic or methacrylic acid; and
(d1) from 0 to 10% by weight of a vinyl compound having a group capable of crosslinking but containing no free carboxylic acid groups or hydroxyl groups.

For the monomers (a1) it is preferred to use acrylic monomers which comprise acrylic and methacrylic esters with alkyl groups composed of from 4 to 10 carbon atoms, preferably from 4 to 9 carbon atoms. Specific examples, but without wishing to be restricted by this enumeration, include n-butyl acrylate, n-pentyl acrylate, n-hexyl acrylate, n-heptyl acrylate, n-octyl acrylate and n-nonyl acrylate, or isomeric compounds such as 2-ethylhexyl acrylate or isononyl acrylate, for example.

For the monomers (b1) it is preferred to use acrylic or methacrylic monomers which carry a linear, cyclic or branched alkyl radical having 11 to 30 carbon atoms, such as lauryl acrylate, stearyl acrylate, behenyl acrylate, isobornyl acrylate and isobornyl methacrylates, for example.

Preferred examples of component (d1) are itaconic anhydride, glyceridyl methacrylate, benzyl acrylate, benzyl methacrylate, phenyl acrylate, benzoin acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, and tetrahydrofurfuryl acrylate, this enumeration not being conclusive.

LAYER B

Polar Layer

The polyacrylate PSA of the polar layer preferably comprises a polymer formed from a second monomer mixture comprising in respect of the second monomer mixture (a2) from 58 to 97% by weight of acrylic and/or methacrylic esters with the formula $CH_2\!=\!CH(R_3)(COOR_4)$ where $R_3$ is H and/or $CH_3$ and $R_4$ represents alkyl chains having 1 to 10 carbon atoms;

(b2) from 3 to 12% by weight of acrylic acid or methacrylic acid; and (c2) from 0 to 30% by weight of a vinyl compound containing a group capable of crosslinking.

For the monomers (a2) it is preferred to use acrylic monomers comprising acrylic and methacrylic esters having alkyl groups consisting of from 4 to 10 carbon atoms, preferably from 4 to 9 carbon atoms. Specific examples, though without wishing to be restrictive by this enumeration, include n-butyl acrylate, n-pentyl acrylate, n-hexyl acrylate, n-heptyl acrylate, n-octyl acrylate, n-nonyl acrylate and their branched isomers, such as 2-ethylhexyl acrylate, for example. Further classes of compound to be used, which may likewise be added in small amounts as part of (a2), are methyl methacrylates or cyclohexyl methacrylates.

For the monomers (c2) it is preferred to use vinyl esters, vinyl ethers, vinyl halides, vinylidene halides, and vinyl compounds having aromatic rings and heterocycles in a position. Here again, mention may be made, non-exclusively, of some examples: vinyl acetate, vinyl formamide, vinyl pyridine, ethyl vinyl ether, vinyl chloride, vinylidene chloride and acrylonitrile. In one further, very preferred version the monomers (c2) used are monomers containing the following functional groups: hydroxyl, carboxyl, epoxy, acid amide, isocyanato or amino groups.

In one advantageous version, for (c2), use is made of acrylic monomers conforming to the following general formula:

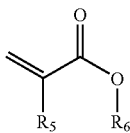

where $R_5$ is H or $CH_3$ and the radical —$OR_6$ represents or comprises a functional group which supports subsequent UV crosslinking of the polyacrylate PSA and which, for example, in a very preferred version, possesses a hydrogen donor activity.

Particularly preferred examples of component (c2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinyl acetic acid, tetrahydrofurfuryl acrylate, β-acryloyloxypropionic acid, trichloroacrylic acid, fumaric acid, crotonic acid, aconitic acid and dimethylacrylic acid, this enumeration not being conclusive.

Preparation of the Polyacrylate PSAs

For the preparation of the polyacrylate PSAs of layers A and B it is advantageous to conduct conventional or controlled free-radical polymerizations. For the polymerizations proceeding via a radical mechanism it is preferred to use initiator systems further comprising additional free-radical initiators for the polymerization, especially thermally decomposing radical-forming azo or peroxo initiators. Initiators suitable in principle include, however, all customary initiators familiar to the person skilled in the art for acrylates. The production of C-centred radicals is described in Houben-Weyl, Methoden der Organischen Chemie, Vol. E 19a, pp. 60-147. These methods are preferentially employed analogously.

Examples of radical sources are peroxides, hydroperoxides and azo compounds. A number of non-exclusive examples of typical free-radical initiators that may be mentioned here include potassium peroxodisulphate, dibenzoyl peroxide, cumene hydroperoxide, cyclohexanone peroxide, di-t-butyl peroxide, azodiisobutyronitrile, cyclohexylsulphonyl acetyl peroxide, diisopropyl percarbonate, t-butyl peroctoate and benzpinacol. In one very preferred version the radical initiator used is 1,1'-azobis(cyclohexanecarbonitrile) (Vazo 88™ from DuPont).

The average molecular weights $M_n$ of the polyacrylate PSAs formed in the free-radical polymerization are very preferably chosen so as to be situated within a range from 20 000 to 2 000 000 g/mol; especially for further use as hot melt PSAs the PSAs prepared have average molecular weights $M_n$ of from 100 000 to 500 000 g/mol. The average molecular weight is determined by size exclusion chromatography (SEC) or matrix-assisted laser desorption/ionization mass spectrometry (MALDI-MS).

The polymerization can be conducted without solvent, in the presence of one or more organic solvents, in the presence of water or in mixtures of organic solvents and water. The aim is to minimize the amount of solvent used. Suitable organic solvents include straight alkanes (e.g. hexane, heptane, octane or isooctane), aromatic hydrocarbons (e.g. benzene, toluene or xylene), esters (e.g. ethyl, propyl, butyl or hexyl acetate), halogenated hydrocarbons (e.g. chlorobenzene), alkanols (e.g. methanol, ethanol, ethylene glycol and ethylene glycol monomethyl ether) and ethers (e.g. diethyl ether and dibutyl ether) or mixtures thereof. The aqueous polymerization reactions can be admixed with a water-miscible or hydrophilic cosolvent so as to ensure that the reaction mixture is in the form of a homogeneous phase during monomer conversion. Cosolvents which can be used with advantage for the present invention are selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulphides, sulphoxides, sulphones, alcohol derivatives, hydroxyether derivatives, amino alcohols, ketones and the like, and also derivatives and mixtures of these.

Depending on conversion and temperature, the polymerization time is between 4 and 72 hours. The higher the level at which it is possible to select the reaction temperature, in other words the higher the thermal stability of the reaction mixture, the lower the reaction time that can be selected.

For the thermally decomposing initiators the introduction of heat is essential to initiate the polymerization. For the thermally decomposing initiators the polymerization can be initiated by heating to from 50 to 160° C., depending on initiator type.

For radical stabilization an advantageous procedure is to use nitroxides of type (NIT 1) or (NIT 2):

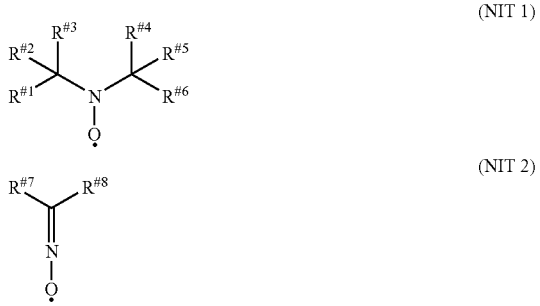

where $R^{\#1}$, $R^{\#2}$, $R^{\#3}$, $R^{\#4}$, $R^{\#5}$, $R^{\#6}$, $R^{\#7}$ and $R^{\#8}$ independently of one another denote the following compounds or atoms:
i) halides, such as chlorine, bromine or iodine, for example;
ii) linear, branched, cyclic and heterocyclic hydrocarbons having 1 to 20 carbon atoms, which may be saturated, unsaturated or aromatic;
iii) esters —$COOR^{\#9}$, alkoxides —$OR^{\#10}$ and/or phosphonates —$PO(OR^{\#11})_2$, where $R^{\#9}$, $R^{\#10}$ and/or $R^{\#11}$ stand for radicals from group ii).

Compounds of structure (NIT 1) or (NIT 2) can also be attached to polymer chains of any kind (primarily such that at least one of the abovementioned radicals constitutes such a polymer chain) and can therefore be used to synthesize the block copolymers, as macroradicals or macroregulators.

Controlled regulators used with greater preference for the polymerization are compounds of the following types:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL
2,2,6,6-tetramethyl-1-piperidinyloxyl (TEMPO), 4-benzoyloxy-TEM PO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl
N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

A range of further polymerization methods by which the polymers can be prepared in an alternative procedure can be selected from the prior art:
U.S. Pat. No. 4,581,429 A discloses a controlled-growth radical polymerization process initiated using a compound of the formula R'R"N—O—Y in which Y is a free radical species which is able to polymerize unsaturated monomers. The reactions, however, generally have low conversions. A particular problem is the polymerization of acrylates, which proceeds only to very low yields and molar masses.

WO 98/13392 A1 describes open-chain alkoxyamine compounds which have a symmetrical substitution pattern. EP 735 052 A1(=U.S. Pat. No. 5,608,023) discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1(=U.S. Pat. No. 6,281,311) discloses specific nitroxyls based on morpholines, piperazinones and piperazinediones. DE 199 49 352 A1(=U.S. Pat. No. 6,664,353) describes heterocyclic alkoxyamines as regulators in controlled-growth radical polymerizations. Corresponding further developments of the alkoxyamines or of the corresponding free nitroxides enhance the efficiency for preparing polyacrylates (Hawker, contribution to the National Meeting of the American Chemical Society, Spring 1997; Husemann, contribution to the IUPAC World-Polymer Meeting 1998, Gold Coast).

As a further controlled polymerization method it is possible advantageously to use atom transfer radical polymerization (ATRP) to synthesize the polymers, with preferably monofunctional or difunctional secondary or tertiary halides being used as initiators and, to abstract the halide(s), complexes of Cu, Ni, Fe, Pd, Pt, Ru, Os, Rh, Co, Ir, Ag or Au (EP 0 824 111 A1 (=U.S. Pat. No. 6,114,482); EP 826 698 A1; EP 824 110 A1 (=U.S. Pat. No. 5,767,210); EP 841 346 A1 (=U.S. Pat. No. 5,811,500); EP 850 957 A1 (=U.S. Pat. No. 5,824,364)). The different possibilities of ATRP are further described in U.S. Pat. No. 5,945,491 A, U.S. Pat. No. 5,854, 364 A and U.S. Pat. No. 5,789,487 A.

It is also possible with advantage to prepare the polymer used in accordance with the invention by way of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, where Me is a metal from group I of the Periodic Table, such as lithium, sodium or potassium, and $P_L(A)$ is a growing polymer block of the monomers A. The molar mass of the polymer under preparation is determined by the ratio of initiator concentration to monomer concentration.

Examples of suitable polymerization initiators include n-propyllithium, n-butyllithium, sec-butyllithium, 2-naphthyllithium, cyclohexyllithium and octyllithium, though this enumeration makes no claim to completeness. Initiators based on samarium complexes are also known for the polymerization of acrylates (Macromolecules, 1995, 28, 7886) and can be used here.

It is also possible, moreover, to use difunctional initiators, such as 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides and alkylaluminium compounds. In one very preferred version the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a version of RAFT polymerization (reversible addition-fragmentation chain transfer polymerization). The polymerization process is described in detail in, for example, WO 98/01478 A1 (=US 2004/171,777) and WO 99/31144 A1 (=U.S. Pat. No. 6,747,111). Suitable with particular advantage for the preparation are trithiocarbonates of the general structure R'''—S—C(S)—S—R''' (Macro-molecules 2000, 33, 243-245).

In one very advantageous version, for example, the trithiocarbonates (TTC1) and (TTC2) or the thio compounds (THI1) and (THI2) are used for the polymerization, in which φ can be a phenyl ring, which can be unfunctionalized or functionalized by alkyl or aryl substituents attached directly or via ester or ether bridges, or can be a cyano group, or can be a saturated or unsaturated aliphatic radical. The phenyl ring φ may optionally bear one or more polymer blocks, examples being polybutadiene, polyisoprene, poly-chloroprene or poly(meth)acrylate, which may have been synthesized in accordance with the definition for P(A) or P(B), or may carry polystyrene, to name but a few. Examples of possible functionalizations include halogens, hydroxyl groups, epoxide groups, and groups containing nitrogen or containing sulphur, without this list making any claim to completeness.

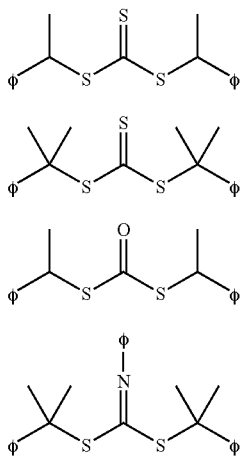

(TTC 1)

(TTC 2)

(THI 1)

(THI 2)

It is additionally possible to employ thioesters of the general structure

particularly in order to prepare asymmetric systems. $R^{S1}$ and $R^{S2}$ may be selected independently of one another and $R^{S1}$ can be a radical from one of groups i) to iv) below, and $R^{S2}$ a radical from one of groups i) to iii) below:
i) $C_1$ to $C_1$-8 alkyl, $C_2$ to $C_{18}$ alkenyl, $C_2$ to $C_{18}$ alkynyl, each linear or branched; aryl, phenyl, benzyl, aliphatic and aromatic heterocycles.
ii) —$NH_2$, —NH—$R^{S3}$, —$NR^{S3}R^{S4}$, —NH—C(O)—$R^{S3}$, —$NR^{S3}$—C(O)—$R^{S4}$, —NH—C(S)—$R^{S3}$, —$NR^{S3}$—C(S)—$R^{S4}$,

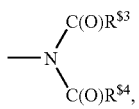

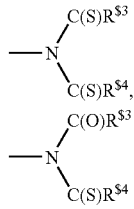

where $R^{S3}$ and $R^{S4}$ are radicals selected independently of one another from group i).
iii) —S—$R^{S5}$ or —S—C(S)—$R^{S5}$, where $R^{S5}$ can be a radical from one of groups i) and ii).
iv) —O—$R^{S6}$ or —O—C(O)—$R^6$, where $R^{S5}$ can be a radical from one of groups i) and ii).

In connection with the abovementioned controlled-growth free-radical polymerizations preferred initiator systems are those additionally comprising free-radical initiators for the polymerization, especially thermally decomposing radical-forming azo or peroxo initiators. In principle, however, all customary initiators known for acrylates are suitable for this purpose. The production of C-centred radicals is described in Houben-Weyl, Methoden der Organischen Chemie, Vol. E19a, p. 60ff. These methods are employed preferentially. Examples of radical sources are peroxides, hydroperoxides and azo compounds. As a number of non-exclusive examples of typical radical initiators mention may be made here of the following: potassium peroxodisulphate, dibenzoyl peroxide, cumene hydroperoxide, cyclohexanone peroxide, cyclohexylsulphonyl acetyl peroxide, di-tert-butyl peroxide, azodiisobutyronitrile, diisopropyl percarbonate, tert-butyl peroctoate and benzpinacol. In one very preferred version the free-radical initiator used is 1,1'-azobis(cyclohexylnitrile) (Vazo 88®, DuPont®) or 2,2-azobis(2-methylbutanenitrile) (Vazo 67®, DuPont®). It is also possible, furthermore, to use radical sources which release radicals only on UV irradiation.

In a conventional RAFT process polymerization is conducted usually only to low conversions (WO 98/01478 A1 (=US 2004/171,777)) in order to realize molecular weight distributions which are as narrow as possible. As a result of the low conversions, however, these polymers cannot be used as PSAs and in particular not as hot melt PSAs, since the high residual monomer content impacts negatively on the technical adhesive properties, the residual monomers contaminate the solvent recyclate in the concentration process, and the corresponding PSA tapes would exhibit a very high level of outgassing.

For the purpose of advantageous further development it is possible to add resins to the polyacrylate PSAs of layers A and B. As tackifying resins to be added it is possible without exception to use all existing tackifier resins described in the literature. Mention may be made, as representatives, of pinene resins, indene resins and rosins, their disproportionated, hydrogenated, polymerized and esterified derivatives and salts, aliphatic and aromatic hydrocarbon resins, terpene resins and terpene-phenolic resins, and also C5, C9 and other hydrocarbon resins. Any desired combinations of these and other resins may be employed in order to adjust the properties of the resultant adhesive in accordance with what is desired. Generally speaking it is possible to use any resins which are compatible (soluble) with the corresponding polyacrylate; reference may be made in particular to all aliphatic, aromatic and alkylaromatic hydrocarbon resins, hydrocarbon resins based on single monomers, hydrogenated hydrocarbon resins, functional hydrocarbon resins and natural resins. For the apolar layer it is preferred accordingly to use apolar resins, such as C5 and C9 HC resins, for example. For the polar PSA layer, on the other hand, preference is given to employing relatively polar resins, such as terpene-phenolic resins or rosins. Categorization into polar and apolar resins can be undertaken by way of the clouding point.

Express reference is made to the depiction of the state of the art in "Handbook of Pressure Sensitive Adhesive Technology" by Donatas Satas (van Nostrand, 1989).

A further possibility, as an option, is to add plasticizers, fillers (e.g. fibres, carbon black, zinc oxide, titanium dioxide, chalk, solid or hollow glass beads, microbeads made from other materials, silica, silicates), nucleators, expandants, compounding agents and/or ageing inhibitors, in the form for example of primary and secondary antioxidants or in the form of light stabilizers.

The internal strength (cohesion) of the PSA is preferably raised by crosslinking. For this purpose it is possible as an option to add compatible crosslinker substances to the acrylate PSAs. Examples of suitable crosslinkers include metal chelates, polyfunctional isocyanates, polyfunctional amines and polyfunctional alcohols. Polyfunctional acrylates as well can be used with advantage as crosslinkers for actinic irradiation.

Preparation of the Bilayer PSA

The PSA of layer A can be applied from solution to the PSA of layer B or vice versa. In one preferred version the PSAs, A or B, are coated from the melt.

For coating from solution it is preferred to use solvents which do not dissolve the PSA layer A or B being coated. For application from the melt the solvent is preferably stripped off under reduced pressure in a concentrating extruder, for which purpose it is possible, for example, to use single-screw or twin-screw extruders which preferably distill off the solvent in different or the same vacuum stages and which possess a feed preheater.

In one further, very preferred process the layers A and B are brought together in a coextrusion process in conjunction with a coextrusion die.

After the coating operation the polyacrylate PSAs are preferably crosslinked. Crosslinking can take place separately, prior to co-lamination, or in one step, through the bonded assembly. The latter is given preference in the sense of the invention, since the bond strengths achieved in this way are higher.

For optional crosslinking with UV light UV-absorbing photoinitiators are added to the acrylate PSAs. Useful photoinitiators which can be used to very good effect are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone and dimethoxy-hydroxy-acetophenone, substituted α-ketols, such as 2-methoxy-2-hydroxypropiophenone, aromatic sulphonyl chlorides, such as 2-naphthylsulphonyl chloride, and photoactive oximes, such as 1-phenyl-1,2-propanedione 2-(O-ethoxycarbonyl) oxime, for example.

The abovementioned and further photoinitiators which can be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenylmorpholine ketone, aminoketone, azobenzoin, thioxanthone, hexaarylbisimidazole, triazine, or fluorenone radicals, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. Further details may be obtained by referring to Carroy et al. in "Chemistry and Technology of UV and EB Formulation for Coatings, Inks and Paints", Oldring (ed.), 1994, SITA, London.

In principle it is also possible to crosslink the polyacrylate PSAs using electron beams. Typical irradiation apparatus which may be employed includes linear cathode systems, scanner systems, and segmented cathode systems where the apparatus in question comprises electron beam accelerators. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably between 80 kV and 300 kV. The scatter doses employed range between 5 to 150 kGy, in particular between 20 and 100 kGy.

The invention further provides for the use of the above-described bilateral pressure-sensitive adhesive of the invention for pressure-sensitive adhesive tapes.

EXAMPLES

The invention is elucidated in more detail below by means of examples, without any intention that it should be restricted unnecessarily by the choice of the examples.

The following test methods were employed in order to evaluate the technical adhesive properties of the PSAs prepared.

Test Methods

180° Bond Strength Test (Test a)

A 20 mm wide strip of a PSA coated onto siliconized release paper was transfer-laminated onto a 25 μm thick, Saran-primed PET film and the resultant PSA tape specimen was subsequently applied to a PE plate and to a steel plate. The PSA strip was pressed onto the substrate twice using a 2 kg weight. In accordance with PSTC-1 the adhesive tape was immediately thereafter peeled from the substrate at a speed of 300 mm/min and an angle of 180° by means of a tensile testing machine (e.g. from Zwick).

The results are reported in N/cm and are averaged from three measurements. All measurements were conducted at room temperature under normalized climate conditions.

Surface Energy (Test B)

In accordance with DIN 53364 the surface energy of the carrier materials was determined using test inks.

Using a brush or special applicator a series of known liquids (test ink DIN 53364, Ahlbrandt System GmbH) is applied in order of their surface tensions to the substrate under investigation. If a liquid no longer wets, i.e., contracts into individual drops within 2 seconds, the "surface energy" of the surface under test corresponds to that of the last-but-one test ink used. The figures are reported in mN/m.

Preparation of Apolar Polyacrylates (Layer A)

Polyacrylate 1:

A 2 L glass reactor conventional for free-radical polymerizations was charged with 8 g of acrylic acid, 272 g of 2-ethylhexyl acrylate, 120 g of isobornyl acrylate and 266 g of acetone:special-boiling-point spirit 60/95 (1:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Thereafter the external heating bath was heated to 75° C. and the reaction was carried out constantly at this external temperature. After a reaction time of 1 hour a further 0.2 g of AIBN in solution in 10 g of acetone was added. After a reaction time of 5 hours 0.8 g of bis(4-tert-butylcyclohexanyl) peroxydicarbonate (Perkadox 16™, Akzo Nobel) in solution in 10 g of acetone was added. After 6 hours the reaction mixture was diluted with 100 g of special-boiling-point spirit 60/95. After 7 hours of reaction 0.8 g of bis(4-tert-butylcyclohexanyl) peroxydicarbonate (Perkadox 16™, Akzo Nobel) in solution in 10 g of acetone was added. After 10 hours the reaction mixture was diluted with 150 g of special-boiling-point spirit 60/95. The reaction was terminated after a time of 24 hours and the reaction mixture cooled to room temperature. The polyacrylate was subsequently blended with 0.6% by weight of aluminium(III) acetylacetonate (3% strength solution in acetone), diluted to a solids content of 30% with special-boiling-point spirit 60/95 and then coated from solution onto siliconized release paper. After drying for 30 minutes at 120° C. the coatweight was 50 g/m². Test method B was conducted to determine the surface energy.

Polyacrylate 2:

A 2 L glass reactor conventional for free-radical polymerizations was charged with 8 g of acrylic acid, 312 g of 2-ethylhexyl acrylate, 80 g of isobornyl acrylate and 266 g of acetone:special-boiling-point spirit 60/95 (1:1). After nitrogen gas had been passed through the reactor for 45 minutes with stirring the reactor was heated to 58° C. and 0.2 g of azoisobutyronitrile (AIBN, Vazo 64™, DuPont) in solution in 10 g of acetone was added. Thereafter the external heating bath was heated to 75° C. and the reaction was carried out constantly at this external temperature. After a reaction time of 1 hour a further 0.2 g of AIBN in solution in 10 g of acetone was added. After a reaction time of 5 hours 0.8 g of bis(4-tert-butylcyclohexanyl) peroxydicarbonate (Perkadox 16™, Akzo Nobel) in solution in 10 g of acetone was added. After 6 hours the reaction mixture was diluted with 100 g of special-boiling-point spirit 60/95. After 7 hours of reaction 0.8 g of bis(4-tert-butylcyclohexanyl) peroxydicarbonate (Perkadox 16™, Akzo Nobel) in solution in 10 g of acetone was added. After 10 hours the reaction mixture was diluted with 150 g of special-boiling-point spirit 60/95. The reaction was terminated after a time of 24 hours and the reaction mixture cooled to room temperature. The polyacrylate was subsequently blended with 0.6% by weight of aluminium(III) acetylacetonate (3% strength solution in acetone), diluted to a solids content of 30% with special-boiling-point spirit 60/95 and then coated from solution onto siliconized release paper. After drying for 30 minutes at 120° C. the coatweight was 50 g/m². Test method B was conducted to determine the surface energy.

Preparation of Polar Polyacrylates (Layer B)

Polyacrylate 3:

A 2 L glass reactor conventional for free-radical polymerizations was charged with 40 g of acrylic acid, 300 g of 2-ethylhexyl acrylate, 60 g of methyl acrylate and 133 g of acetone/isopropanol (96:4). After nitrogen gas had been passed through the reactor for 45 minutes with stirring the reactor was heated to 58° C. and 0.2 g of azoisobutyronitrile (AIBN, Vazo 64 ™, DuPont) was added. Thereafter the external heating bath was heated to 75° C. and the reaction was carried out constantly at this external temperature. After a reaction time of 1 hour a further 0.2 g of AIBN was added. After 4 h and after 8 h dilution was carried out, in each case with 100 g of a mixture of acetone/isopropanol (96:4). In order to reduce the residual initiators 0.6 g portions of bis(4-tert-butylcyclohexanyl) peroxydicarbonate (Perkadox 16™™, Akzo Nobel) were added after 8 h and after 10 h. After a reaction time of 24 hours the reaction was terminated and the reaction mixture cooled to room temperature.

Subsequently the polymer was freed from solvent under reduced pressure (1 torr) and with heating (95° C.) and at 160° C. it was coated onto the apolar PSA (polyacrylate 1 or 2) using a GID melt die. Anchorage was improved by means of placement with electrostatic charging. Eltex charging rods were used for this purpose.

For crosslinking, the resultant polymer was irradiated with electrons, using an instrument from Electron Crosslinking AB, Halmstad, Sweden. The bonded PSA assembly was guided through on a chill roll, present as standard, beneath the Lenard window of the accelerator. In the zone of irradiation the atmospheric oxygen was displaced by flushing with pure nitrogen. The belt speed was 10 m/min in each case. Irradiation was carried out at 40 kGray (kilograys) with an acceleration voltage of 200 kV. Test method B was conducted to determine the surface energy.

Polyacrylate 4:

A 2 L glass reactor conventional for free-radical polymerizations was charged with 28 g of acrylic acid, 80 g of methyl acrylate, 292 g of 2-ethylhexyl acrylate and 200 g of acetone/isopropanol (95:5). After nitrogen gas had been passed through the reactor for 45 minutes with stirring the reactor was heated to 58° C. and 0.2 g of azoisobutyronitrile (AIBN, Vazo 64™, DuPont) was added. Thereafter the external heating bath was heated to 75° C. and the reaction was carried out constantly at this external temperature. After a reaction time of 1 hour a further 0.2 g of AIBN was added. After 4 h and after 8 h dilution was carried out, in each case with 100 g of a mixture of acetone/isopropanol (95:5). In order to reduce the residual initiators 0.6 g portions of bis(4-tert-butylcyclohexanyl) peroxydicarbonate (Perkadox 16™, Akzo Nobel) were added after 8 h and after 10 h. After a reaction time of 24 hours the reaction was terminated and the reaction mixture cooled to room temperature. Subsequently the polyacrylate was freed from solvent in a vacuum drying cabinet at 1 torr and 95° C. and at a temperature of 160° C. in the flag of melt it was coated from the melt onto the apolar PSA (polyacrylate 1 or 2) using a GID melt die. Anchorage was improved by means of placement with electrostatic charging. Eltex charging rods were used for this purpose.

For crosslinking, the resultant polymer was irradiated with electrons, using an instrument from Electron Crosslinking AB, Halmstad, Sweden. The bonded PSA assembly was guided through on a chill roll, present as standard, beneath the Lenard window of the accelerator. In the zone of irradiation the atmospheric oxygen was displaced by flushing with pure nitrogen. The belt speed was 10 m/min in each case. Irradiation was carried out at 40 kGy (kilograys) with an acceleration voltage of 200 kV. Test method B was conducted to determine the surface energy.

The bilayer PSAs of the invention are described below. The FIGURE "50 g/m²" refers to the weight of the respective polymers per unit area. The production process is included in the description (polyacrylate 3 and polyacrylate 4).

Example 1

Layer A: polyacrylate 1 (50 g/m²)
Layer B: polyacrylate 3 (50 g/m²)

Example 2

Layer A: polyacrylate 1 (50 g/m²)
Layer B: polyacrylate 4 (50 g/m²)

Example 3

Layer A: polyacrylate 2 (50 g/m²)
Layer B: polyacrylate 3 (50 g/m²)

Example 4

Layer A: polyacrylate 2 (50 g/m²)
Layer B: polyacrylate 4 (50 g/m²)

Results

To determine the surface energy first of all test method B was conducted with all four polyacrylates. The results are summarized in Table 1.

TABLE 1

|  | Surface energy in mN/m |
| --- | --- |
| Polyacrylate 1 | 46 |
| Polyacrylate 2 | 48 |
| Polyacrylate 3 | 58 |
| Polyacrylate 4 | 60 |

Table 1 shows that the apolar polyacrylates 1 and 2 possess a much lower surface energy.

For the further use of the PSAs of the invention the four exemplary PSAs were bonded to PE and steel and the bond strengths on the different surfaces were measured. The results are reported in Table 2. The phrase "layer A bonded" means that the layer A was bonded to PE or steel. The phrase "layer B bonded" means that the layer B was bonded to PE or steel.

TABLE 2

|  | Test A BS steel in N/cm Layer A bonded | Test A BS steel in N/cm Layer B bonded | Test A BSPE in N/cm Layer A bonded | Test A BSPE in N/cm Layer B bonded |
| --- | --- | --- | --- | --- |
| Example 1 | 5.2 | 4.3 | 1.4 | 0.6 |
| Example 2 | 5.3 | 4.3 | 1.5 | 0.7 |
| Example 3 | 5.5 | 5.1 | 2.5 | 0.6 |
| Example 4 | 5.8 | 5.4 | 2.2 | 0.8 |

BS: bond strength

Table 2 shows that very different PSA bond strengths are generated on different substrates with the bilayer PSA of the invention.

LIST OF REFERENCE NUMERALS USED

1 apolar layer (layer A)
2 polar layer (layer B)

We claim:
1. Bilayer pressure-sensitive adhesive comprising an apolar layer applied directly to a polar layer,
the apolar layer and the polar layer each comprising a polyacrylate pressure-sensitive adhesive having a static glass transition temperature of not more than +15° C., and
the surface energy of the apolar layer differing from the surface energy of the polar layer by at least 5 mN/m.
2. Bilayer pressure-sensitive adhesive according to claim 1, wherein the polyacrylate pressure-sensitive adhesive of the apolar layer comprises a polymer formed from a first monomer mixture, said first monomer mixture

(a1) from 58 to 90% by weight of acrylic and/or methacrylic esters of the formula $CH_2=CH(R_1)(COOR_2)$ where $R_1$ is H or $CH_3$ and $R_2$ is a linear or branched alkyl radical having 1 to 10 carbon atoms;
(b1) from 10 to 40% by weight of acrylic and/or methacrylic esters of the formula $CH_2=CH(R_{1a})(COOR_{2a})$ where $R_{1a}$ is H or $CH_3$ and $R_{2a}$ is a linear, cyclic or branched alkyl radical having 11 to 30 carbon atoms;
(c1) from 0 to 2% by weight of acrylic or methacrylic acid; and
(d1) from 0 to 10% by weight of a vinyl compound having a group capable of crosslinking but containing no free carboxylic acid groups or hydroxyl groups; and the polyacrylate pressure-sensitive adhesive of the polar layer comprises a polymer formed from a second monomer mixture, said second monomer mixture comprising
(a2) from 58 to 97% by weight of acrylic and/or methacrylic esters of the formula $CH_2=CH(R_3)(COOR_4)$ where $R_3$ is H and/or $CH_3$ and $R_4$ represents H and/or alkyl chains having 1 to 10 carbon atoms;
(b2) from 3 to 12% by weight of acrylic acid or methacrylic acid; and
(c2) from 0 to 30% by weight of a vinyl compound containing a group capable of crosslinking.
3. Bilayer pressure-sensitive adhesive according to claim 2, wherein component (a1) is an acrylic or methacrylic ester having an alkyl group containing 4 to 9 carbon atoms.
4. Bilayer pressure-sensitive adhesive according to claim 2, wherein component (d1) is an aromatic vinyl compound whose aromatic nucleus contains 4 to 18 carbon atoms.
5. Bilayer pressure-sensitive adhesive according to claim 2, wherein component (a2) is an acrylic or methacrylic ester having an alkyl group containing 4 to 9 carbon atoms.
6. Bilayer pressure-sensitive adhesive according to claim 2, wherein component (c2) is a compound of the formula

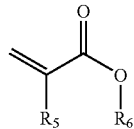

where $R_5$ is H or $CH_3$ and the radical $-OR_6$ is or comprises a functional group which supports UV crosslinking of the polyacrylate pressure-sensitive adhesive.
7. A pressure-sensitive adhesive tape comprising the bilayer pressure-sensitive of claim 1.
8. Process for preparing the bilayer pressure-sensitive adhesive of claim 1, wherein the polyacrylate pressure-sensitive adhesive of the apolar layer is applied from solution to the polyacrylate pressure-sensitive adhesive of the polar layer.
9. Process for preparing the bilayer pressure-sensitive adhesive of claim 1, wherein the polyacrylate pressure-sensitive adhesive of the polar layer is applied from solution to the polyacrylate pressure-sensitive adhesive of the apolar layer.
10. Process for preparing the bilayer pressure-sensitive adhesive of claim 1, wherein the polyacrylate pressure-sensitive adhesive of the polar layer and the polyacrylate pressure-sensitive adhesive of the apolar layer are brought together during a coextrusion process.

* * * * *